(12) United States Patent
Hwang et al.

(10) Patent No.: US 10,770,948 B2
(45) Date of Patent: Sep. 8, 2020

(54) MOTOR INCLUDING AN ELASTIC MESH SUPPORTING A BEARING

(71) Applicant: LG ELECTRONICS INC., Seoul (KR)

(72) Inventors: Eunji Hwang, Seoul (KR); Sunggi Kim, Seoul (KR); Hangjin Ban, Seoul (KR)

(73) Assignee: LG Electronics Inc., Seoul (KR)

( * ) Notice: Subject to any disclaimer, the term of this patent is extended or adjusted under 35 U.S.C. 154(b) by 231 days.

(21) Appl. No.: 15/698,884

(22) Filed: Sep. 8, 2017

(65) Prior Publication Data

US 2018/0076683 A1 Mar. 15, 2018

(30) Foreign Application Priority Data

Sep. 9, 2016 (KR) .................. 10-2016-0116747

(51) Int. Cl.
| | |
|---|---|
| *H02K 5/16* | (2006.01) |
| *H02K 5/24* | (2006.01) |
| *H02K 7/08* | (2006.01) |
| *H02K 9/06* | (2006.01) |
| *A47L 9/00* | (2006.01) |
| *H02K 5/173* | (2006.01) |
| *H02K 5/20* | (2006.01) |
| *A47L 9/22* | (2006.01) |

(52) U.S. Cl.
CPC .......... *H02K 5/1732* (2013.01); *A47L 9/0081* (2013.01); *H02K 5/20* (2013.01); *H02K 9/06* (2013.01); *A47L 9/22* (2013.01); *H02K 5/16* (2013.01); *H02K 5/24* (2013.01); *H02K 7/08* (2013.01); *H02K 7/083* (2013.01); *H02K 7/088* (2013.01); *H02K 2213/09* (2013.01)

(58) Field of Classification Search
CPC .......... H02K 5/1732; H02K 5/20; H02K 9/06; H02K 2213/09; H02K 5/16; H02K 5/24; A47L 9/0081; A47L 9/22
USPC ............................................. 310/51, 90, 91
See application file for complete search history.

(56) References Cited

U.S. PATENT DOCUMENTS

| | | | |
|---|---|---|---|
| 4,514,458 A | 4/1985 | Thorn | |
| 5,059,042 A * | 10/1991 | Grierson | F16C 27/04 384/537 |

(Continued)

FOREIGN PATENT DOCUMENTS

| | | |
|---|---|---|
| EP | 2899414 A1 | 7/2015 |
| JP | 11252851 | 9/1999 |

(Continued)

OTHER PUBLICATIONS

Extended European Search Report in European Application No. 17190144.0, dated Feb. 13, 2018, 7 pages.

*Primary Examiner* — Jue Zhang
*Assistant Examiner* — David A. Singh
(74) *Attorney, Agent, or Firm* — Fish & Richardson P.C.

(57) ABSTRACT

A motor includes a motor housing, a rotating shaft assembly including a rotating shaft, a rotor, and a bearing in which the rotor and the bearing are mounted to the rotating shaft. The motor further includes a stator installed in the motor housing, the stator surrounding the rotor, a bracket mounted to the motor housing, and an elastic mesh that defines a plurality of pores, that is disposed between the bracket and the bearing, and that contacts at least one of the bracket or the bearing.

19 Claims, 10 Drawing Sheets

(56) References Cited

U.S. PATENT DOCUMENTS

| | | | | |
|---|---|---|---|---|
| 6,351,046 B1* | 2/2002 | Bradfield | ............. | H02K 7/1004 |
| | | | | 310/62 |
| 6,630,761 B1* | 10/2003 | Gabrys | .................. | F16C 27/04 |
| | | | | 310/90 |
| 2003/0007865 A1* | 1/2003 | Chard | .................... | F01D 17/16 |
| | | | | 415/150 |
| 2003/0169951 A1* | 9/2003 | Nishijima | ............. | F16C 17/042 |
| | | | | 384/103 |
| 2005/0123398 A1* | 6/2005 | Tam | ......................... | A47L 5/22 |
| | | | | 415/211.2 |
| 2007/0017192 A1* | 1/2007 | Bednarek | ............... | B01D 1/221 |
| | | | | 55/405 |
| 2007/0096572 A1* | 5/2007 | Watkins | .................. | F16C 27/04 |
| | | | | 310/90 |
| 2010/0213777 A1* | 8/2010 | de la Haye | .............. | H02K 7/09 |
| | | | | 310/90.5 |
| 2012/0006670 A1* | 1/2012 | Kamen | ............... | B01D 1/0082 |
| | | | | 202/185.1 |
| 2012/0073950 A1* | 3/2012 | Kamen | .................... | B01D 1/28 |
| | | | | 202/187 |
| 2015/0198084 A1 | 7/2015 | Daimer | | |
| 2016/0146366 A1* | 5/2016 | Takahashi | ............. | F16K 3/0254 |
| | | | | 251/129.15 |
| 2017/0012570 A1* | 1/2017 | Bauer | ...................... | F16C 27/00 |
| 2018/0036745 A1* | 2/2018 | Buchalla | .................. | H02K 5/24 |

FOREIGN PATENT DOCUMENTS

| | | |
|---|---|---|
| KR | 20-2008-0004155 | 9/2008 |
| KR | 10-1287468 | 7/2013 |
| KR | 10-2013-0129228 | 11/2013 |
| KR | 10-2016-0097885 | 8/2016 |

\* cited by examiner

MOTOR INCLUDING AN ELASTIC MESH SUPPORTING A BEARING

CROSS-REFERENCE TO RELATED APPLICATIONS

The present application claims priority under 35 U.S.C. §§ 119 and 365 to Korean Patent Application No. 10-2016-0116747 filed on Sep. 9, 2016, which is hereby incorporated by reference in its entirety.

FIELD

The present disclosure relates to a motor, and more particularly, to a motor including a bearing mounted to a rotating shaft of the motor.

BACKGROUND

A motor may be installed in a household appliance such as a vacuum cleaner. For example, a motor in a vacuum cleaner may generate a driving force for suctioning dust into a dust collecting part.

An example motor may include a motor housing, a stator installed in the motor housing, a rotor rotated by the stator, and a rotating shaft having the rotor mounted thereon.

In some examples, the rotating shaft of the motor may be supported by at least two bearings. The rotating shaft may be rotated at high speed while being supported by the at least two bearings.

In some cases, the at least two bearings may be mounted at different positions of the rotating shaft. The at least two bearings may support the rotating shaft at positions spaced apart from each other.

In some examples, a motor may be configured as an assembly of a plurality of parts, and an assembly tolerance may exist in the assembly.

A bearing provided in the motor may be installed in a state in which the bearing can be distorted due to the assembly tolerance. In this case, the amount of abrasion of the bearing may increase, and the lifespan of the bearing may be shortened.

SUMMARY

This disclosure describes implementations of a motor which can decrease abrasion of a bearing and increase the lifespan of the bearing.

According to one aspect of subject matter described in this application, a motor includes a motor housing, a rotating shaft assembly including a rotating shaft, a rotor, and a bearing in which the rotor and the bearing are mounted to the rotating shaft. The motor further includes a stator installed in the motor housing, the stator surrounding the rotor, a bracket mounted to the motor housing, and an elastic mesh that defines a plurality of pores, that is disposed between the bracket and the bearing, and that contacts at least one of the bracket or the bearing.

Implementations according to this aspect may include one or more of following features. The elastic mesh may include a metal wire mesh in which at least one metal wire has one or more curved portions. The elastic mesh may have a hollow cylindrical shape, and the plurality of pores may be open toward a radial direction of the elastic mesh. In some examples, a height of the elastic mesh may be greater than a height of the bearing.

In some implementations, the elastic mesh may include a mesh part that has a shape that is curled at least twice. In some cases, the mesh part may include an inner mesh part located at an innermost side in a radial direction, the inner mesh part contacting an outer circumferential surface of the bearing, and an outer mesh part located at an outermost side in the radial direction, the outer mesh part contacting the bracket.

In some implementations, the motor may further include a thermal conductive adhesive that fixes the elastic mesh to at least one of an outer circumferential surface of the bearing or the bracket. The motor may further include an O-ring that is fixed to the rotating shaft and located between the elastic mesh and the rotating shaft. The O-ring may support the bearing and have an external diameter less than an internal diameter of the elastic mesh.

In some implementations, the O-ring and the elastic mesh may define a gap between an outer circumference of the O-ring and the elastic mesh. The bearing may include an inner rim fixed to the rotating shaft, an outer rim spaced apart from the inner rim, and a rolling member disposed between the inner rim and the outer rim. The bracket may include an elastic mesh housing part that has an internal diameter greater than an external diameter of the outer rim, and the elastic mesh may be disposed between the outer rim and the elastic mesh housing part.

In some implementations, the motor may further include an O-ring that is mounted to the rotating shaft and that contacts the inner rim, the O-ring being spaced apart from the elastic mesh. The O-ring may include an inner ring contacting the inner rim, and an outer ring spaced apart from the outer rim. The outer ring may have an external diameter less than an internal diameter of the elastic mesh.

In some implementations, the bracket may further include a cover part that covers a portion of the bearing between the inner rim and the outer rim, and the elastic mesh may have a first end that contacts the cover part. In some examples, the elastic mesh may have a second end that is spaced apart from the rotor, the second end facing toward the rotor. The motor may further include a second bearing mounted to the rotating shaft, the motor housing may include a hollow part having an internal diameter greater than a diameter of the rotating shaft, and the hollow part may contact the second bearing to thereby support the second bearing.

In some implementations, the motor may further include a second bearing mounted to the rotating shaft, and a second elastic mesh defining a plurality of pores. The motor housing may include a hollow part that has an internal diameter greater than a diameter of the rotating shaft, and the second elastic mesh is disposed between an inner surface of the hollow part and an outer surface of the second bearing.

According to another aspect of subject matter described in this application, a motor includes a motor housing, a rotating shaft assembly including a rotating shaft, a rotor, and a bearing in which the rotor and the bearing are mounted to a rotating shaft. The motor further includes a stator installed in the motor housing, the stator surrounding the rotor, an impeller connected to the rotating shaft, an impeller cover that surrounds an outer circumference of the impeller in which the impeller cover defines an air inlet between the impeller and the impeller cover, a bracket mounted to at least one of the motor housing or the impeller cover, an elastic mesh that defines a plurality of pores, that is disposed between the bracket and the bearing, and that contacts at least one of the bracket or the bearing, and a diffuser mounted to at least one of the impeller cover or the bracket in which the diffuser includes a guide vane configured to guide air toward a space between the elastic mesh and the rotor.

Implementations according to this aspect may include one or more of following features. The bearing may include an inner rim fixed to the rotating shaft, an outer rim spaced apart from the inner rim, and a rolling member disposed between the inner rim and the outer rim. The bracket may include an elastic mesh housing part that has an internal diameter greater than an external diameter of the outer rim, and the elastic mesh may be disposed between the outer rim and the elastic mesh housing part.

In some implementations, the bracket may include a cover part that covers a portion of the bearing between the inner rim and the outer rim, and the elastic mesh has a first end that contacts the cover part. The elastic mesh may have a second end that is spaced apart from the rotor, the second end facing toward the rotor. In some examples, the motor may further include a second bearing mounted to the rotating shaft, and a second elastic mesh defining a plurality of pores. The motor housing may include a hollow part that has an internal diameter greater than a diameter of the rotating shaft, the second bearing may have an external diameter less than the internal diameter of the hollow part, and the second elastic mesh may be disposed between an inner surface of the hollow part and an outer surface of the second bearing.

According to the present disclosure, the plurality of pores formed in the elastic mesh can efficiently dissipate heat transferred from the bearing while assisting the elastic mesh to be smoothly elastically deformed. In some implementations, the elastic mesh having the plurality of pores can generate a damping effect, thereby absorbing external impact. Thus, it may be possible to highly reduce noise and vibration and to improve the reliability of the motor.

In some implementations, the metal wire mesh having the plurality of pores has a high elastic deformation rate, and can maintain the alignment of the bearing, In some implementations to heat dissipation.

In some implementations, when the concentricities of the bearing and the second bearing spaced apart from each other do not correspond to each other due to an assembly tolerance, the elastic mesh elastically deformed by the bearing can align the position of the bearing, and the concentricities of the bearing and second bearing can correspond to each other through a simple structure of the elastic mesh.

In some implementations, the elastic mesh aligns the position of the bearing, and the second elastic mesh aligns the position of the second bearing, so that the position of each of the bearing and the second bearing can be optimally aligned.

In some implementations, air guided by the guide vane of the diffuser is flowed into the elastic mesh, so that heat transferred from the bearing to the elastic mesh can be efficiently dissipated.

The details of one or more implementations are set forth in the accompanying drawings and the description below. Other features will be apparent from the description and drawings, and from the claims.

DETAILED DESCRIPTION

Hereinafter, exemplary implementations of the present disclosure will be described in detail with reference to the accompanying drawings.

Figure 1:
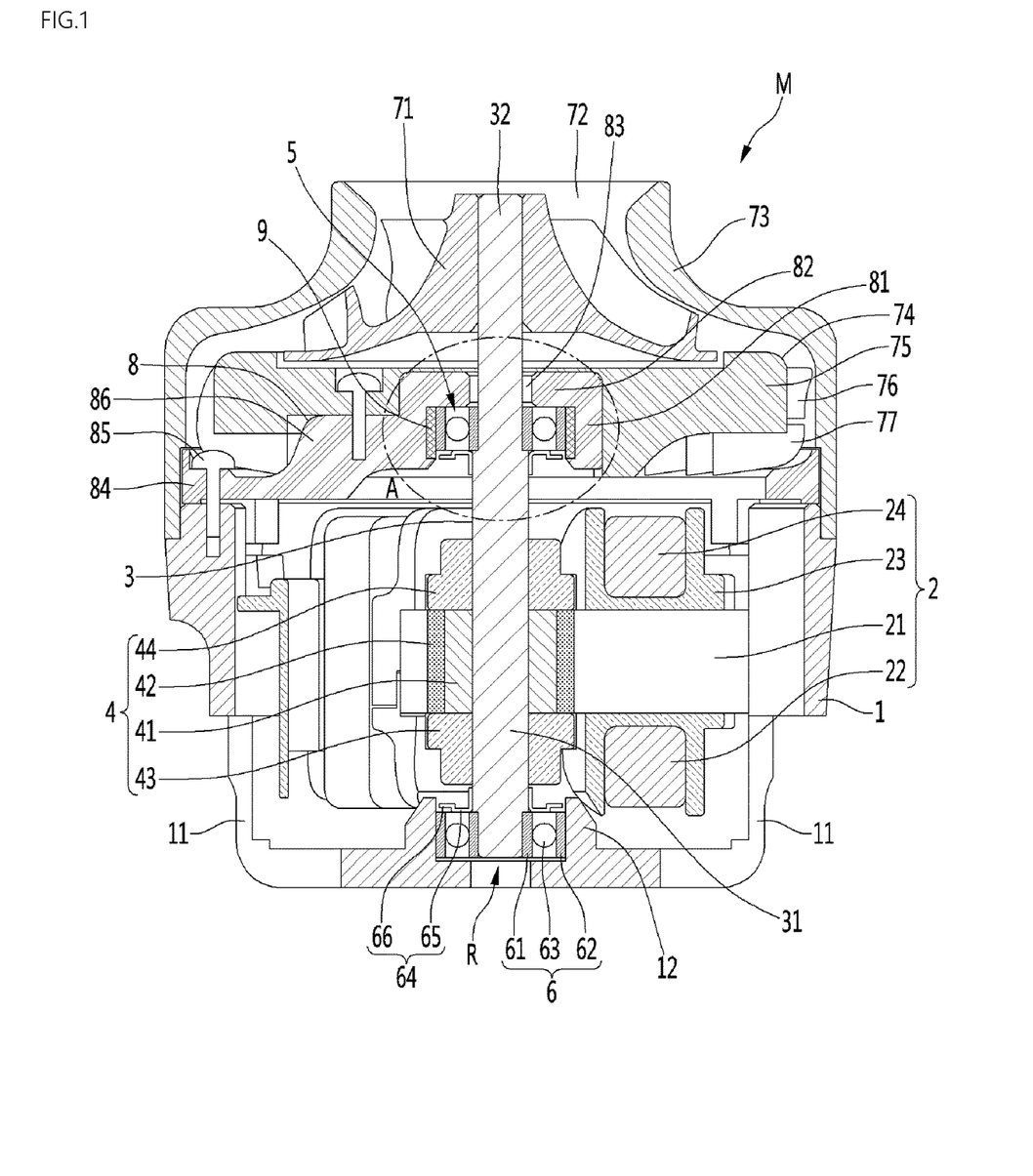
FIG. 1 is a sectional view showing an example motor.
Figure 2:
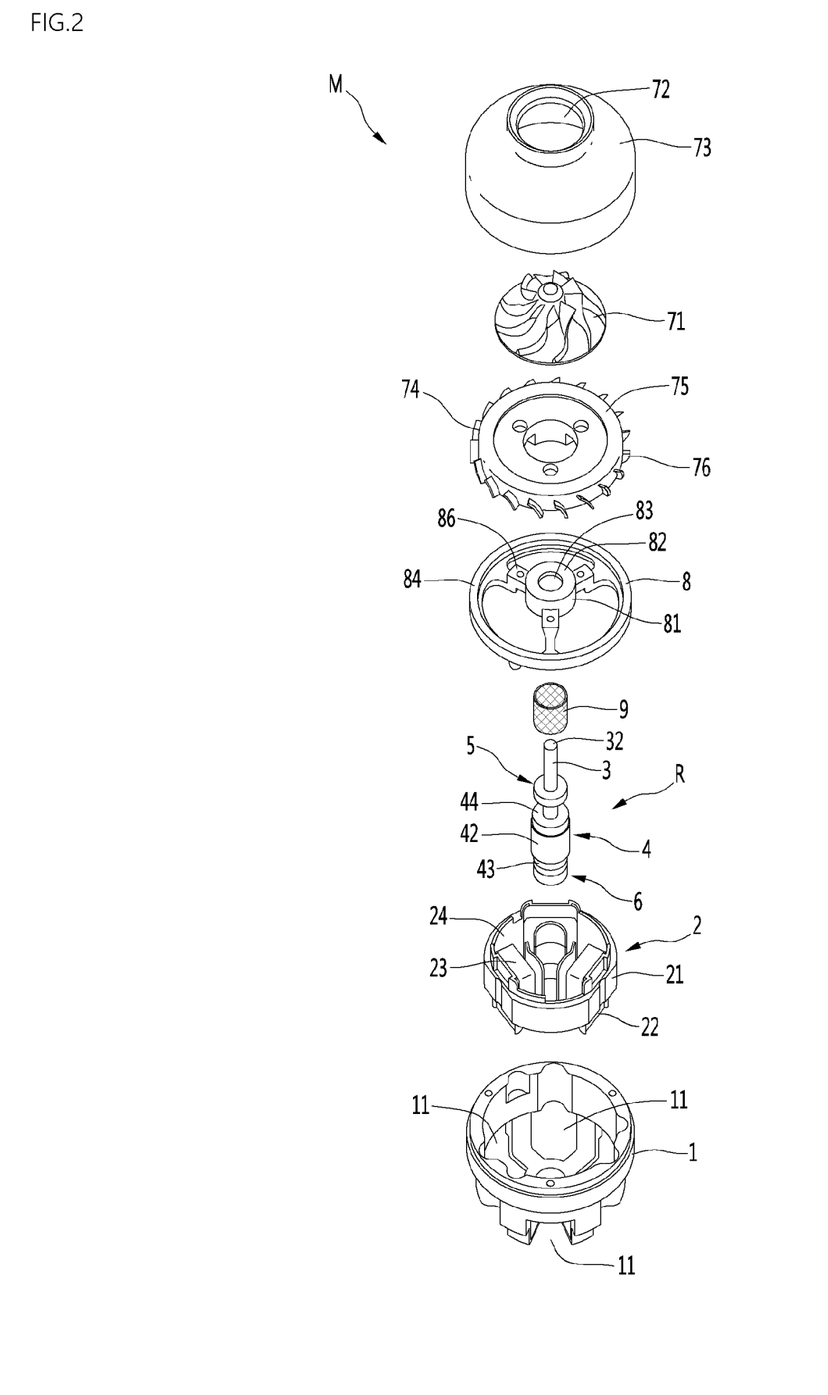
FIG. 2 is an exploded perspective view showing the example motor.
Figure 3:
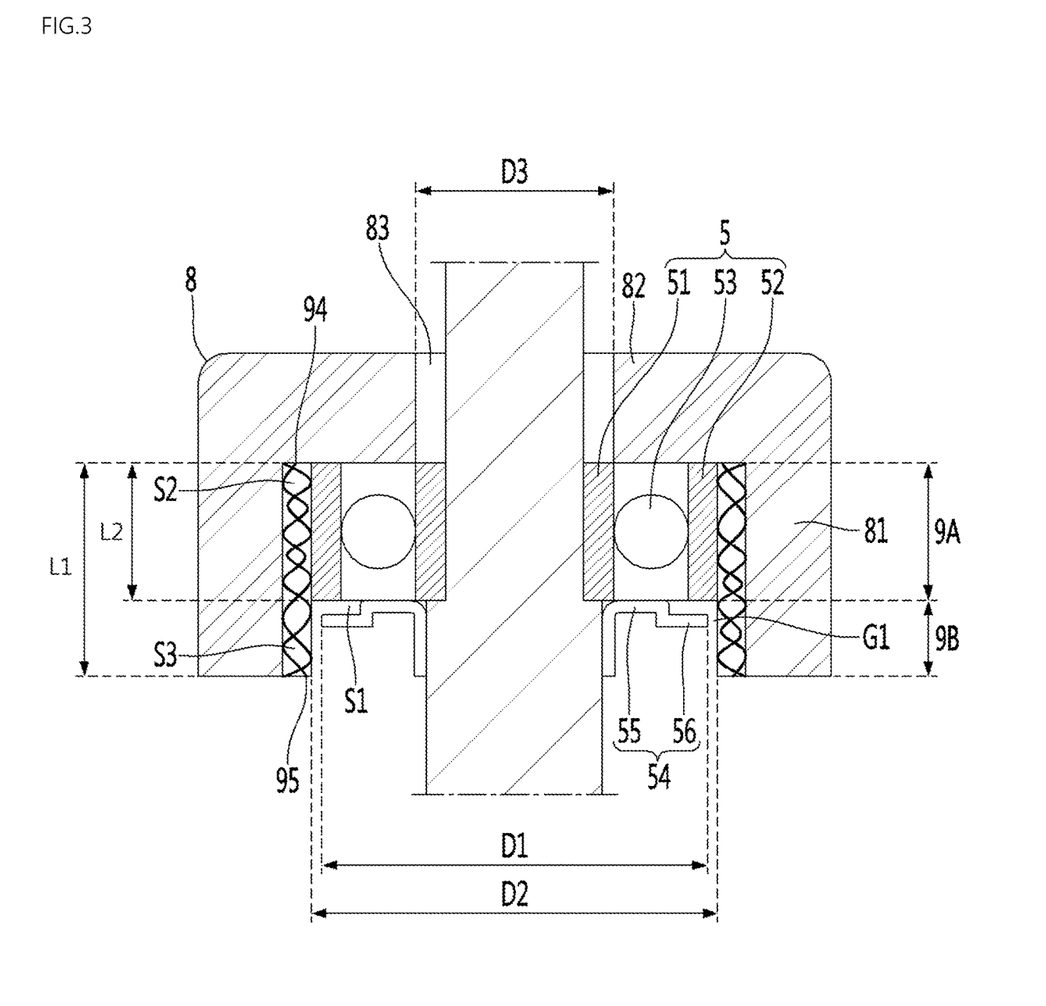
FIG. 3 is an enlarged sectional view of portion A of FIG. 1.
Figure 4:
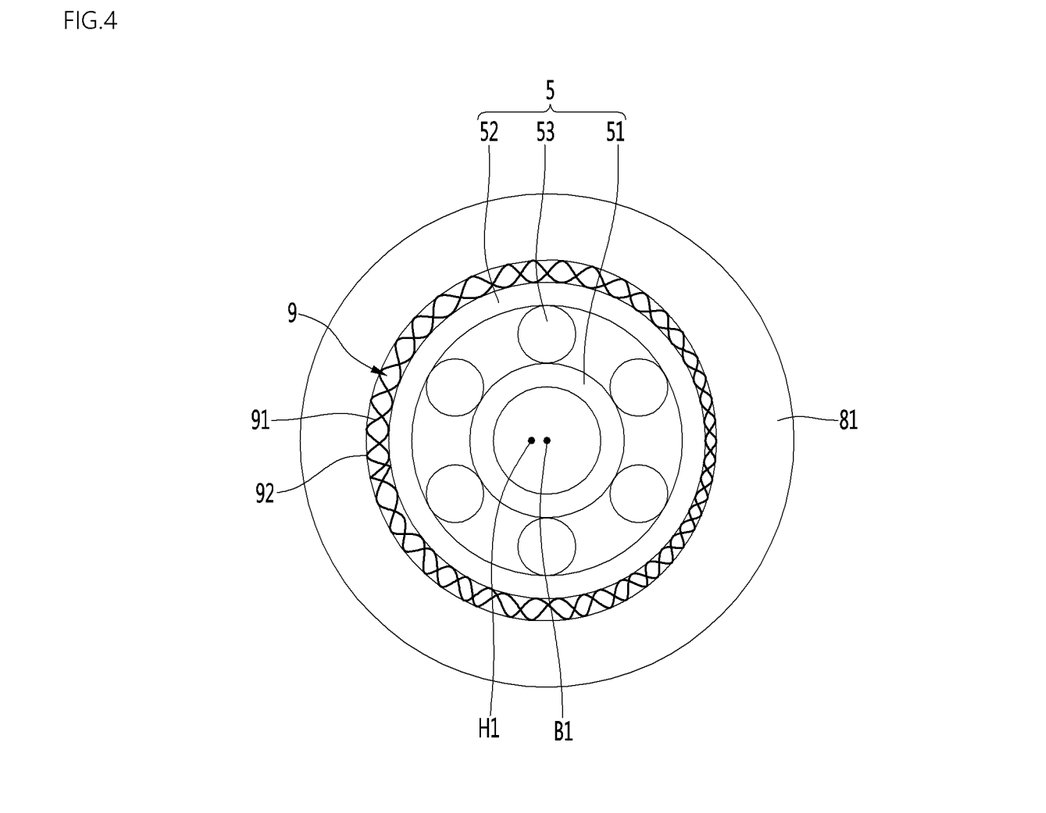
FIG. 4 is a cross-sectional view showing an example elastic mesh elastically deformed by an example bearing.

FIG. 1 is a sectional view showing an example motor. FIG. 2 is an exploded perspective view showing the example motor. FIG. 3 is an enlarged sectional view of portion A of FIG. 1. FIG. 4 is a cross-sectional view when an example elastic mesh is elastically deformed by an example bearing.

The example motor M includes a motor housing 1, a rotating shaft assembly R, a stator 2, a bracket 8, and an elastic mesh 9.

The motor housing 1 may form an external appearance of the motor M. The motor housing 1 may have a hollow cylindrical shape having one open surface. An air outlet 11 through which air inside the motor housing 1 is discharged to the outside may be formed in the motor housing 1. A plurality of air outlets 11 may be formed in the motor housing 1.

The rotating shaft assembly R may include a rotating shaft 3, and a rotor 4 and a bearing 5, which are mounted to the rotating shaft 3.

The stator 2 may be installed in the motor housing 1. The stator 2 may be mounted to the motor housing 1 using a fastening member such as a screw.

The stator 2 may be formed in a hollow cylindrical shape. The stator 2 may be installed to surround the outer circumference of the rotor 4.

The stator 2 may be configured as an assembly of a plurality of members. The stator 2 may include a stator core 21, a pair of insulators 22 and 23 coupled to the stator core 21, and a coil 24 disposed at the insulators 22 and 23.

The rotating shaft 3 is rotated together with the rotor 4, and may be supported by a bearing 5. The rotating shaft 3 may be rotated by the rotor 4.

A portion of the rotating shaft 3 may be located inside the motor housing 1, and the rest of the rotating shaft 3 may be located inside an impeller cover 73 which will be described later. The rotating shaft 3 may be disposed long from the inside of the motor housing 1 to the inside of the impeller cover 73.

In some implementations, an example impeller connection part 32 to which an impeller 71 is connected may be formed at the rotating shaft 3. The impeller connection part 32 may be formed at a position spaced apart from a part 31 surrounded by the rotor 4. The impeller connection part 32 may be formed at an end portion of the rotating shaft 3.

A second bearing mounting part at which a second bearing 6 which will be described later is mounted may be formed at the rotating shaft 3.

The rotor 4 may be mounted to surround a portion of the rotating shaft 3. The rotor 4 may be rotatably located inside the stator 2. The rotor 4 may be formed in a hollow cylindrical shape.

The rotor 4 may include an iron core 41 fixed to the rotating shaft 3, a magnet 42 installed at the iron core 41, and a pair of end plates 43 and 44 that fix the magnet 42.

The rotor 4 may be mounted to surround the part 31 between one end and the other end of the rotating shaft 3. The rotor 4 may be mounted between the impeller connection part 32 and the bearing mounting part.

The bearing 5 may include an inner rim 51 fixed to the rotating shaft 3, an outer rim 52 spaced apart from the inner rim 51, and a rolling member 53 disposed between the inner rim 51 and the outer rim 52.

The bearing 5 may be one of a roller bearing and a ball bearing. The bearing 5 may be configured as a ball bearing in which the rolling member 53 is configured as a ball to have high performance in high-speed rotation.

In some implementations, the motor M may further include an O-ring 54 that is fixed to the rotating shaft 3 and that supports bearing 5.

The O-ring 54 may be fixed to the rotating shaft 3, and may be included in a rotating shaft assembly or in a rotor assembly together with the rotating shaft 3 and the rotor 4.

The O-ring 54 may be located between the bearing 5 and the rotor 4 in the length direction of the rotating shaft 3. The O-ring 54 may restrict the bearing 5 from moving toward the rotor 4. The O-ring 54 may serve as a bearing stopper supporting the bearing 5.

The O-ring 54 may be fixed to the rotating shaft 3 to come in contact with a portion of the bearing 5. At least one portion of the O-ring 54 may face the inner rim 51 of the bearing 5. The O-ring 54 may come in contact with the inner rim 51 of the bearing 5. The O-ring 54 may be a bearing stopper that restricts the inner rim 51 of the bearing 5 from sliding toward the rotor 4.

The external diameter D1 of the O-ring 54 may be smaller than the internal diameter D2 of the elastic mesh 9.

The O-ring 54 may be located inside the elastic mesh 9. When the rotating shaft 3 rotates, the O-ring 54 may be rotated in an empty space formed inside the elastic mesh 9.

A gap G1 may be formed between the outer circumference of the O-ring 54 and the elastic mesh 9, and the O-ring 54 and the elastic mesh 9 may not come in contact with each other. If the O-ring 54 and the elastic mesh 9 come in contact with each other, at least one of the O-ring 54 and the elastic mesh 9 may be abraded. On the other hand, if the O-ring 54 and the elastic mesh 9 do not come in contact with each other, the lifespan of each of the O-ring 54 and the elastic mesh 9 can be maximized.

The O-ring 54 may be mounted to the rotating shaft 3, come in contact with the inner rim 51 of the bearing 5, and be spaced apart from the elastic mesh 9.

The O-ring 54 may include an inner ring 55 coming in contact with the inner rim 51 and an outer ring 56 spaced apart from the outer rim 52. The outer circumference of the outer ring may be the outer circumference of the O-ring 54, and the external diameter of the outer ring 56 may be the external diameter D1 of the O-ring 54.

In the motor M, a portion of the rotating shaft 3, which is located inside the motor housing 1, may be directly supported by the motor housing 1.

When the rotating shaft 3 is directly supported by the motor housing 1, a rotating shaft support part rotatably supporting the rotating shaft 3 may be formed in the motor housing 1. The rotating shaft support part may be formed in the motor housing 1 to surround the outer circumference of the rotating shaft 3. A lubrication medium for preventing abrasion between the rotating shaft 3 and the rotating shaft support part, such as a lubricant, may be provided to at least one of the rotating shaft 3 and the rotating shaft support part.

In some implementations, in the motor M, the portion of the rotating shaft 3, which is located inside the motor housing 1, may be supported through the second bearing 6. The motor M may further include the second bearing 6 mounted to the rotating shaft 3, and the second bearing 6 may rotatably support the rotating shaft 3.

The second bearing 6 may be mounted to the rotating shaft 3 to be spaced apart from the bearing 5. The second bearing 6 may be spaced apart from the bearing 5 in the length direction of the rotating shaft 3.

The bearing 5 and the second bearing 6 may rotatably support the rotating shaft 3 at positions spaced apart from each other. In this case, the weight of the rotating shaft 3 may be distributed by the bearing 5 and the second bearing 6.

In the motor M, the bearing 5 and the second bearing 6 may be mounted together between the rotor 4 and the impeller 71. In this case, the bearing 5 and the second bearing 6 may be mounted at a position between the rotor 4 and the impeller 71 to be spaced apart from each other in the axial direction of the rotating shaft 3.

In some implementations, in the motor M, the bearing 5 and the second bearing 6 may be mounted to be spaced apart from each other with the rotor 4 interposed therebetween. In this case, the bearing 5 and the second bearing 6 may support the rotating shaft 3 by efficiently distributing the weight of the rotating shaft 3. When the bearing 5 and the second bearing 6 are arranged with the rotor 4 interposed therebetween, the maximum weight applied to the bearing 5 and the second bearing 6 is lower than that when the bearing 5 and the second bearing 6 are mounted together between the rotor 4 and the impeller 71, and the lifespan of each of the bearing 5 and the second bearing 6 is longer than that when the bearing 5 and the second bearing 6 are mounted together between the rotor 4 and the impeller 71. In some implementations, when the bearing 5 and the second bearing 6 are arranged with the rotor 4 interposed therebetween, a separate space for allowing the bearing 5 and the second bearing 6 to be spaced apart from each other is not required, and the motor M can be compact as compared with when the bearing 5 and the second bearing 6 are mounted together between the rotor 4 and the impeller 71.

The second bearing 6 may be located between the rotating shaft 3 and the motor housing 1 to support the rotating shaft 3. In this case, the second bearing 6 may be spaced apart from the bearing 5 with the rotor 4 interposed therebetween.

In some cases, when the motor M includes both of the bearing 5 and the second bearing 6, the bearing 5 may be a load-side bearing close to the impeller 71, and the second bearing 6 may be a non-load-side bearing distant from the impeller 71, or vice versa.

In some implementations, when the motor M includes both of the bearing 5 and the second bearing 6, the bearing 5 may be a bracket-side bearing surrounded by the bracket 8, and the second bearing 6 may be a motor housing-side bearing surrounded by motor housing 1.

The bearing 5 may be a first bearing mounted between the impeller 71 and the second bearing 6, for example, or between the impeller 71 and the rotor 4, and the second bearing 6 may be an end bearing mounted at an end portion of the rotating shaft 3, which is opposite to the impeller 71.

When the rotating shaft 3 is supported by the second bearing 6, the second bearing 6 may be mounted to the rotating shaft 3 to be located inside the motor housing 1. A hollow part 12 larger than the rotating shaft 3 may be formed in the motor housing 14. The hollow part 12 may be formed larger than the second bearing 6. The second bearing 6 may be directly supported by the motor housing 1, or may be supported by the motor housing 1 with a separate elastic member interposed therebetween.

When the second bearing 6 is directly supported by the motor housing 1, the outer circumferential surface of the second bearing 6 may come in contact with the hollow part 12 to be supported by the hollow part 12.

The second bearing 6 may include an inner rim 61 fixed to the rotating shaft 3, an outer rim 62 spaced apart from the inner rim 61, and a rolling member 63 disposed between the inner rim 61 and the outer rim 62.

In some implementations, the second bearing 6 may be one of a roller bearing and a ball bearing. The second bearing 6 may be configured as a ball bearing in which the rolling member 63 is configured as a ball to have high performance in high-speed rotation.

The inner rim 61 of the second bearing 6 may be fixed to the rotating shaft 3, and the outer rim 62 of the second bearing 6 may come in contact with the hollow part 12 to be fixed to the hollow part 12.

The motor M may further include a second O-ring 64 fixed to the rotating shaft 3, the second O-ring 64 supporting the second bearing 6. The second O-ring 64 may be fixed to the rotating shaft 3, and may be included in a rotating shaft assembly or in a rotor assembly together with the rotating shaft 3 and the rotor 4.

The second O-ring 64 may be located between the second bearing 6 and the rotor 4 in the length direction of the rotating shaft 3. The second O-ring 64 may restrict the second bearing 6 from moving toward the rotor 4. The second O-ring 64 may serve as a bearing stopper supporting the second bearing 6.

The second O-ring 64 may be fixed to the rotating shaft 3 to come in contact with a portion of the second bearing 6. At least one portion of the second O-ring 64 may face the inner rim 61 of the second bearing 6. The second O-ring 64 may come in contact with the inner rim 61 of the second bearing 6. The second O-ring 64 may be a bearing stopper that restricts the inner rim 61 of the second bearing 6 from sliding toward the rotor 4.

The second O-ring 64 may be mounted to the rotating shaft 3, come in contact with the inner rim 61 of the second bearing 6, and be spaced apart from the hollow part 12.

The second O-ring 64 may include an inner ring 65 coming in contact with the inner rim 61 of the second bearing 6 and an outer ring 66 spaced apart from the outer rim 62 of the second bearing 6.

In some implementations, the motor M may further include the impeller 71 connected to the rotating shaft 3, and the impeller cover 73 surrounding the outer circumference of the impeller 71, the impeller cover 73 having an air inlet 72 formed therein.

The impeller 71 may be rotated together with the rotating shaft 3 in the state in which the impeller 71 is connected to the rotating shaft 3. The impeller 71 may be located between the impeller cover 73 and a diffuser 74 which will be described later.

The impeller cover 73 may protect the impeller 71 by surrounding the outer circumference of the impeller 71.

A surface of the impeller cover 73 may open toward the motor housing 1. The impeller cover 73 may be disposed to cover one open surface of the motor housing 1. The impeller cover 73 may be coupled to the motor housing 1 or the bracket 8 using a fastening member such as a screw, for example, or may be screw-coupled to the motor housing 1 or the bracket 8.

The air inlet 72 may be formed smaller than the surface of the impeller cover 73, which is opposite to the motor housing 1.

The inner circumferential surface of the impeller cover 73 may be spaced apart from the impeller 7, and air flowed by the impeller 71 may be flowed between the inner circumference of the impeller cover 73 and the impeller 71.

In some implementations, the motor M may further include the diffuser 74 located inside the impeller cover 73. The diffuser 74 may be mounted to at least one of the impeller cover 73 and the bracket 8.

The diffuser 74 may include a body part 75 having a smaller size than the impeller cover 73, a diffuser vane 76 protruding from the outer circumference of the body part 75, and a guide vane 77 guiding air flowed by the diffuser vane 76.

The diffuser vane 76 may be formed to change the dynamic pressure of air passing through the impeller 71 to static pressure.

The guide vane 77 may be formed to guide air of which pressure is increased by the diffuser vane 76 to at least one of the elastic mesh 9 and the rotor 4.

The guide vane 77 may guide air toward between the elastic mesh 9 and the rotor 4. A portion of the air guided by the guide vane 77 may be flowed into the elastic mesh 9 to dissipate heat of the elastic mesh 9.

The bracket 8 may be mounted to at least one of the motor housing 1 and the impeller cover 73.

In some examples, an elastic mesh housing part 81 of which internal diameter is greater than the external diameter of the outer rim 52 of the bearing 5 may be formed at the bracket 8. A gap in which the elastic mesh 9 can be accommodated may be formed between the outer rim 52 of the bearing 5 and the elastic mesh housing part 81.

The elastic mesh housing part 81 may be formed larger than the O-ring 54, and the internal diameter of the elastic mesh housing part 81 of the bracket 8 may be greater than the external diameter of the O-ring 54. The O-ring 54 may be rotated in a space formed inside the elastic mesh housing part 81. A gap may be formed between the inner circumferential surface of the elastic mesh housing part 81 of the bracket 8 and the outer circumference of the O-ring 54. The gap may be larger than the thickness of the elastic mesh 9.

The bracket 8 may include a cover part 82 covering between the inner rim 51 and the outer rim 52. The cover part 82 may be formed in a shape bent from the elastic mesh housing part 81. The cover part 82 may be formed in a ring shape at one end of the elastic mesh housing part 81. A rotating shaft through-hole 83 through which the rotating shaft 3 rotatably passes may be formed in the cover part 82. The diameter D3 of the rotating shaft through-hole 83 may be smaller than the internal diameter D2 of the elastic mesh 9.

The cover part 82 may be spaced apart from the O-ring 54, and a bearing accommodation space S1 in which the bearing 5 is accommodated may be formed between a surface of the O-ring 54 facing the bearing 5 and a surface of the cover part 82 facing the bearing 5.

The bracket 8 may include a fastening part 84 fastened to at least one of the motor housing 1 and the impeller cover 73. The fastening part 84 may be formed in a ring shape. The fastening part 84 may be fastened to at least one of the motor housing 1 and the impeller cover 73 using a fastening member 85 such as a screw. The fastening part 84 may be formed larger than the elastic mesh housing part 81. The bracket 8 may include at least one connection part 86 connecting the fastening member 85 and the elastic mesh housing part 81.

In some implementations, the bearing 5 and the second bearing 6 may be mounted such that their center axes correspond to each other. When the center axes of the bearing 5 and the second bearing 6 do not correspond to each other, the abrasion of any one of the bearing 5 and the second bearing 6 may be large.

In the motor M, the center axis H1 of the elastic mesh housing part 81 and the center axis of the hollow part 12 may not correspond to each other due to an assembly tolerance of the motor housing 1 and the bracket 8. For example, when the bearing and the second bearing 6 are mounted with the rotor 4 interposed therebetween, a concentricity error between the bearing 5 and the second bearing 6 may be increased.

Although the center axis H1 of the elastic mesh housing part 81 and the center axis of the hollow part 12 do not correspond to each other, the elastic mesh 9 may adjust the position of the bearing 5 to be aligned with the position of the second bearing 6 such that the center axis B1 of the bearing 5 and the center axis of the second bearing 6 closely correspond to each other.

The elastic mesh 9 may be disposed between the bracket 8 and the bearing 5, and may support bearing 5. The elastic mesh 9 may be press-fitted between the bracket 8 and the bearing 5.

In some implementations, in the motor M, the concentricities of the bearing 5 and the second bearing 6 may not correspond to each other due to the assembly tolerance of the motor housing 1 and the bracket 8. When the concentricities of the bearing 5 and the second bearing 6 may not correspond to each other as described above, the elastic mesh 9 may support the bearing 5 such that the concentricity of the bearing 5 corresponds to that of the second bearing 6 in a state in which a portion of the elastic mesh 9 is elastically compressed.

The bearing 5, as shown in FIG. 4, may pressurize a portion of the elastic mesh 9 in case the center axis B1 of the bearing 5 and the center axis H1 of the elastic mesh housing part 81 do not correspond to each other. In this case, the elastic mesh 9 may support the bearing 5 in the state in which the portion pressurized by the bearing 5 is compressed.

The elastic mesh 9 may be formed in a structure in which the elastic mesh 9 can be easily elastically deformed, and heat transferred from the bearing 5 can be easily dissipated.

A plurality of pores S2 and S3 may be formed in the elastic mesh 9. The elastic mesh 9 may be disposed between the bracket 8 and the bearing 5 to come in contact with at least one of the bracket 8 and the bearing 5.

The elastic mesh 9 may have a hollow cylindrical shape. A cylindrical empty space may be formed inside the elastic mesh 9.

The elastic mesh 9 may be disposed between the outer rim 52 and the elastic mesh housing part 81.

The height L1 may be greater than the height L2 of the bearing 5. A portion of the elastic mesh 9 may be disposed between the outer rim 52 and the elastic mesh housing part 81. The internal diameter of the elastic mesh 9 may be equal to or smaller than the external diameter of the outer rim 52. In some implementations, the external diameter of the elastic mesh 9 may be equal to or smaller than the internal diameter of the elastic mesh housing part 81. A portion of the elastic mesh 9 may be press-fitted between the outer rim 52 and the elastic mesh housing part 81, and may be fixed between the elastic mesh housing part 81 and the outer rim 52 in the state in which the portion of the elastic mesh 9 is press-fitted.

In some implementations, the internal diameter D2 of the elastic mesh 9 may be greater than the external diameter D1 of the outer ring 56.

The elastic mesh 9 may include a first area 9A that faces the bearing 5 and a second area 9B that does not face the bearing 5.

The first area 9A of the elastic mesh 9 may face the bearing accommodation space S1. The second area 9B of the elastic mesh 9 may include an area that faces the O-ring 54. The second area 9B of the elastic mesh 9 may further include an area that does not face both of the bearing accommodation space S1 and the O-ring 54.

The elastic mesh 9 may have one end 94 spaced apart from the impeller 71 and the diffuser 74, the one end 94 facing the cover part 82. The one end o4 of the elastic mesh 9 may come in contact with the cover part 82. When the one end 94 of the elastic mesh 9 comes in contact with the cover part 82, the one end 94 of the elastic mesh 9 may be held by the cover part 82, and the mounting position of the elastic mesh 9 may be determined by the cover part 82.

In some implementations, the elastic mesh 9 may be protected by the elastic mesh housing part 81, the cover part 82, and the outer rim 52.

In some implementations, the elastic mesh 9 may have the other end 95 spaced apart from the rotor 4, the other end 95 facing the rotor 4. The other end of the elastic mesh 9 may be located at the outside of the bearing accommodation space S1.

The elastic mesh 9 may include a metal wire mesh in which at least one metal wire 91 is irregularly tangled.

Heat of the bearing 5 may be transferred to the metal wire 91, and the heat transferred to the metal wire 91 may be transferred to the bracket 8 through a bracket contact part 92 of the metal wire 91, which comes in contact with the bracket 8.

In some implementations, the heat transferred to the metal wire 91 may be dissipated in an air cooling manner through the second area 9B of the metal wire 91, which does not face the bearing 5.

For example, the heat of the bearing 5 may be transferred to the bracket 8 through the elastic mesh 9, and the heat transferred to the bracket 8 may be transferred to air in the motor M through the elastic mesh 9.

The plurality of pores S2 and S3 may be open in the radial direction of the elastic mesh 9. The plurality of pores S2 and S3 may include at least one first pore S2 that faces the outer rim 52 of the bearing 5 and at least one second pore S3 that does not face the outer rim 52 of the bearing 5.

The second pore S3 may be located at the outside of the bearing accommodation space S1, and the air guided by the diffuser 74 may be introduced into the elastic mesh 9 through the second pore S3.

Hereinafter, an example of heat dissipation of the bearing will be described in detail as follows.

In the motor M, when the rotating shaft 3 rotates, the impeller 71 may be rotated, and air may be suctioned into the impeller 71 through the air inlet 72.

The air suctioned into the impeller 71 may be flowed into the diffuser 74, and the air flowed into the diffuser 74 may be sequentially guided by the diffuser vane 76 and the guide vane 77.

The air guided by the guide vane 77 may be flowed toward between the elastic mesh 9 and the rotor 4, and a portion of the air may be flowed into the elastic mesh 9 to be introduced into the plurality of pores S2 and S3 of the elastic mesh 9.

A process in which air is introduced into the elastic mesh 9 will be described in detail. The air may be introduced into the elastic mesh 9 through the second pore S3 of the elastic mesh 9, which is located at the outside of the bearing accommodation space S1, and at least a portion of the air may be guided to the outer rim 52 of the bearing 5 and the elastic mesh housing part 81 to be flowed into the first pore S2. For example, the air may be introduced into not only the second pore S3 of the elastic mesh 9 but also the first pore S2 of the elastic mesh 9.

The air introduced into the plurality of pores S2 and S3 of the elastic mesh 9 may come in contact with each of the bearing 5, the elastic mesh 9, and the elastic mesh housing part 81 between the outer circumferential surface of the bearing 5 and the elastic mesh housing part 81, and may absorb heat of each of the bearing 5, the elastic mesh 9, and the elastic mesh housing part 81.

Figure 5:
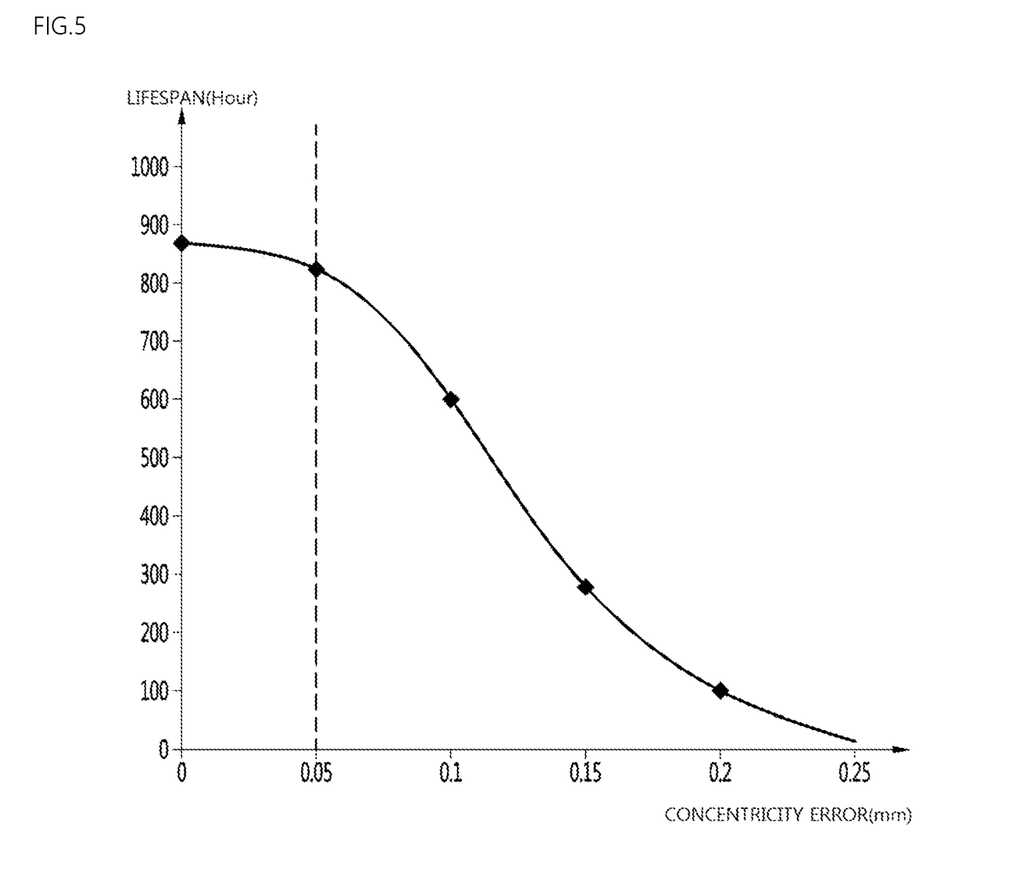
FIG. 5 is a graph showing an example lifespan of example bearings with respect to their concentricity errors.

FIG. 5 is a graph showing an example lifespan of each bearing with respect to its concentricity error between the bearings.

FIG. 5 is, for example, a graph showing an example lifespan of each bearing with respect to its concentricity error between the bearing 5 and the second bearing 6, shown in FIG. 1. When the concentricity error between the bearing 5 and the second bearing 6 is 0.05 mm or less, the lifespan of each bearing can be highly maintained. When the concentricity error between the bearing 5 and the second bearing 6 is 0.05 mm or more, the lifespan of each bearing is rapidly decreased as shown in FIG. 5.

For example, the concentricity error between the bearing 5 and the second bearing 6 may be maintained to be 0.05 mm or less. In this example, although the center axis of the bearing 5 and the center axis of the second bearing 6 do not correspond to each other, the elastic mesh 9 elastically deformed by the bearing 5 can maintain the center axis of the bearing 5 and the center axis of the second bearing 6 to have an error of 0.05 mm or less, and thus the lifespan of each of the bearing 5 and the second bearing 6 can be maximized.

Figure 6:
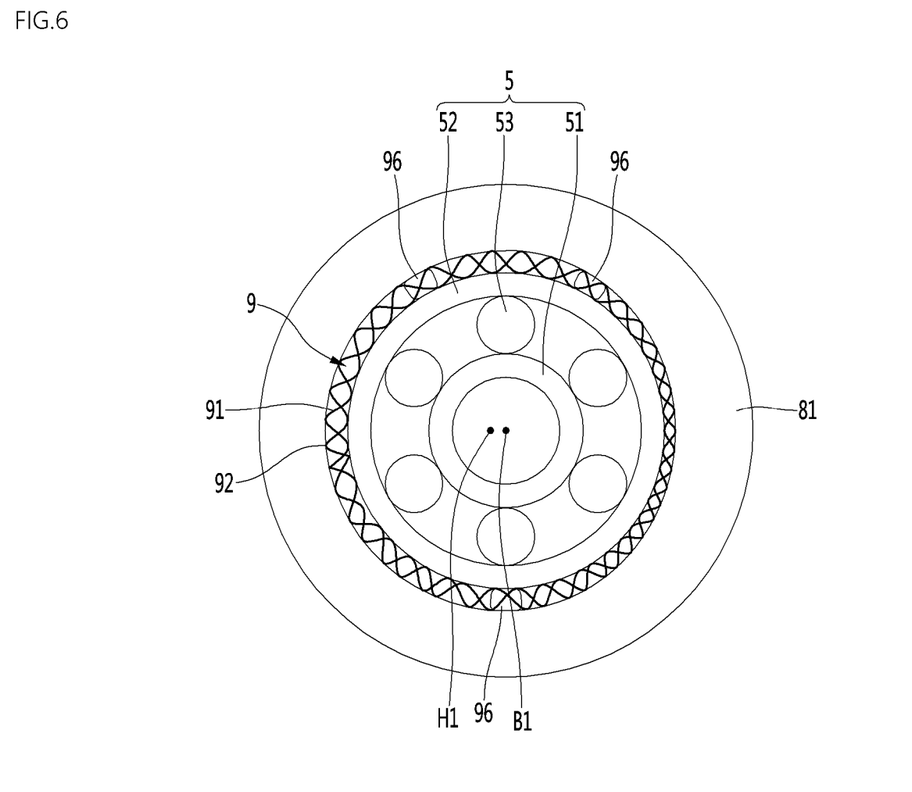
FIG. 6 is a sectional view showing another example of the elastic mesh shown in FIG. 4.

FIG. 6 is a sectional view showing another example of the elastic mesh shown in FIG. 4.

The motor M may include a thermal conductive adhesive 96 that may fix the elastic mesh 9 to at least one of the outer circumferential surface of the bearing 5 and the bracket 8.

For example, the thermal conductive adhesive 96 may be located between the outer rim 52 of the bearing 5 and the elastic mesh housing part 81 of the bracket 8.

The thermal conductive adhesive 96 may restrict the elastic mesh 9 from being arbitrarily separated between the outer rim 52 of the bearing 5 and the elastic mesh housing part 81 of the bracket 8.

The thermal conductive adhesive 96 may be formed at a plurality of portions between the outer rim 52 of the bearing 5 and the elastic mesh housing part 81 of the bracket 8.

Air introduced into the elastic mesh 9 may be diffused into the elastic mesh 9 while passing between the thermal conductive adhesives 96.

Figure 7:
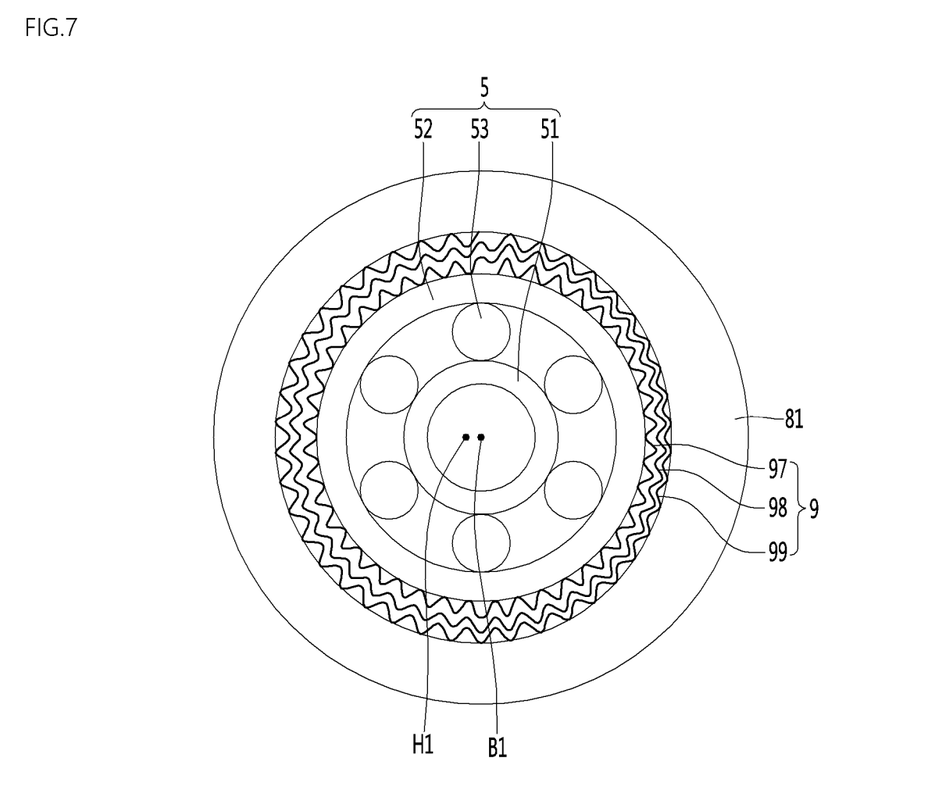
FIG. 7 is a sectional view showing still another example of the elastic mesh shown in FIG. 4.

FIG. 7 is a sectional view showing still another example of the elastic mesh shown in FIG. 4.

An elastic mesh 9' may have a shape in which a mesh part having a plurality of pores formed therein is curled at least twice.

In some implementations, the elastic mesh 9' may be manufactured by curling, plural times, a strip-shaped mesh part in a scroll form. The strip-shaped mesh part may be formed of a metal having a high heat transfer performance. The strip-shaped mesh part may be configured such that a plurality of metal wires are irregularly coupled, or may be configured such that a plurality of metal wires are arranged in a regular pattern such as a grid pattern.

In the elastic mesh 9', an inner mesh part 97 located at the innermost side in the radial direction may come in contact with the outer circumferential surface of the bearing 5. In some implementations, an outer mesh part 99 located at the outermost side in the radial direction may come in contact with the bracket 8. At least a portion of the outer mesh part 99 may come in contact with the elastic mesh housing part 81 of the bracket 8.

The elastic mesh 9' may further include at least one center mesh part 98 located between the inner mesh part 97 and the outer mesh part 99. The center mesh part 98 may be curled to surround the inner mesh part 97, and the outer mesh part 99 may be curled to surround the center mesh part 98.

The elastic mesh 9' may include the inner mesh part 97 and the outer mesh part 99 without the center mesh part 98. In this case, the outer mesh part 99 may be curled to surround the inner mesh part 97.

In some implementations, the elastic mesh 9' entirely formed in a hollow cylindrical shape can be manufactured through a simple process of curling, plural times, one strip-shaped mesh part in a scroll form. In some implementations, heat can be dissipated through not only the pores formed in the mesh part but also pores between the mesh parts 97, 98, and 99 sequentially arranged in the radial direction.

Figure 8:
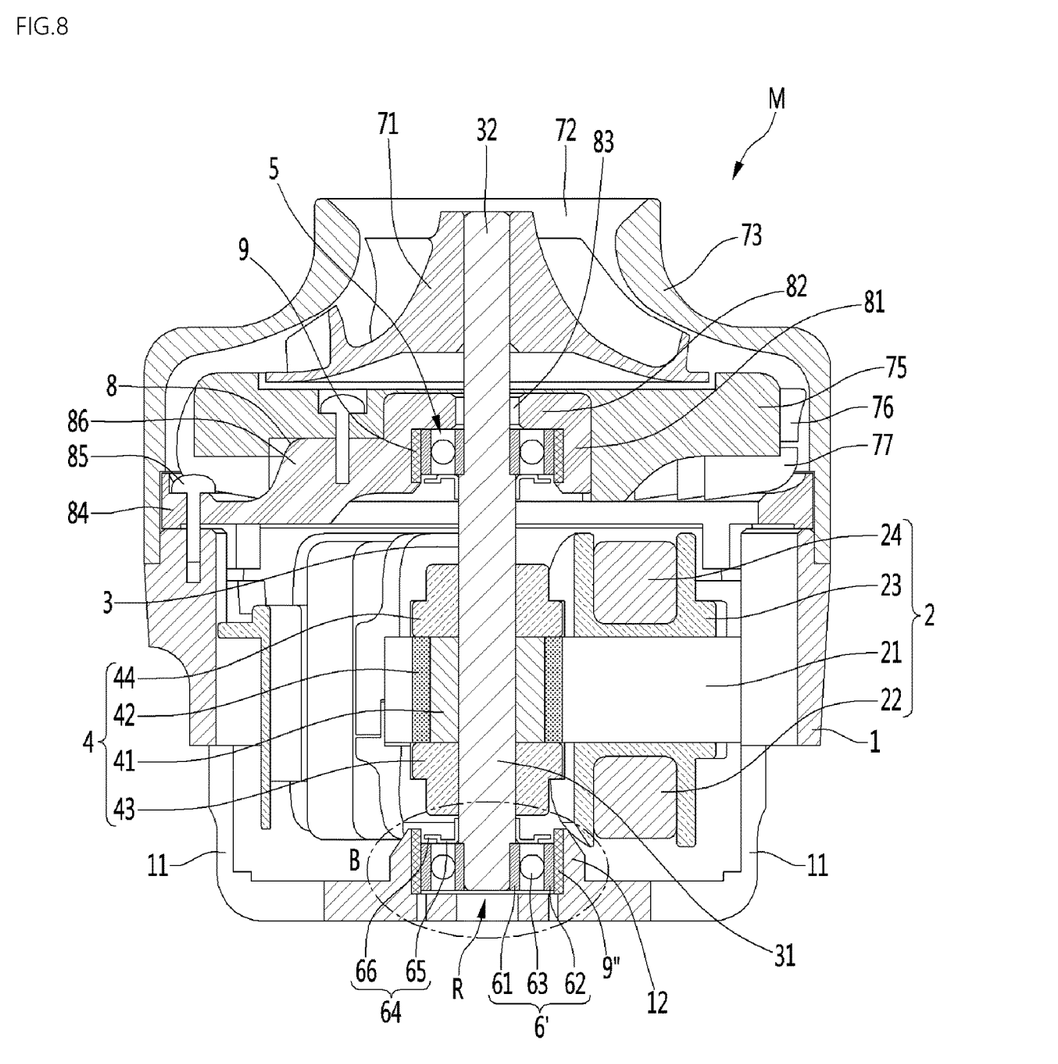
FIG. 8 is a sectional view showing another example motor.
Figure 9:
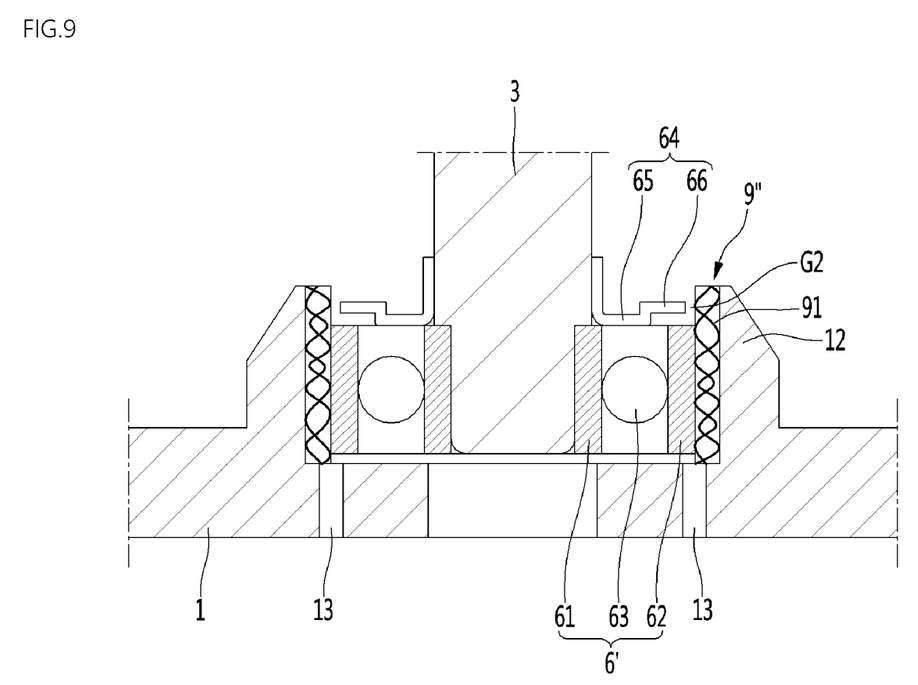
FIG. 9 is an enlarged sectional view of portion B of FIG. 8.
Figure 10:
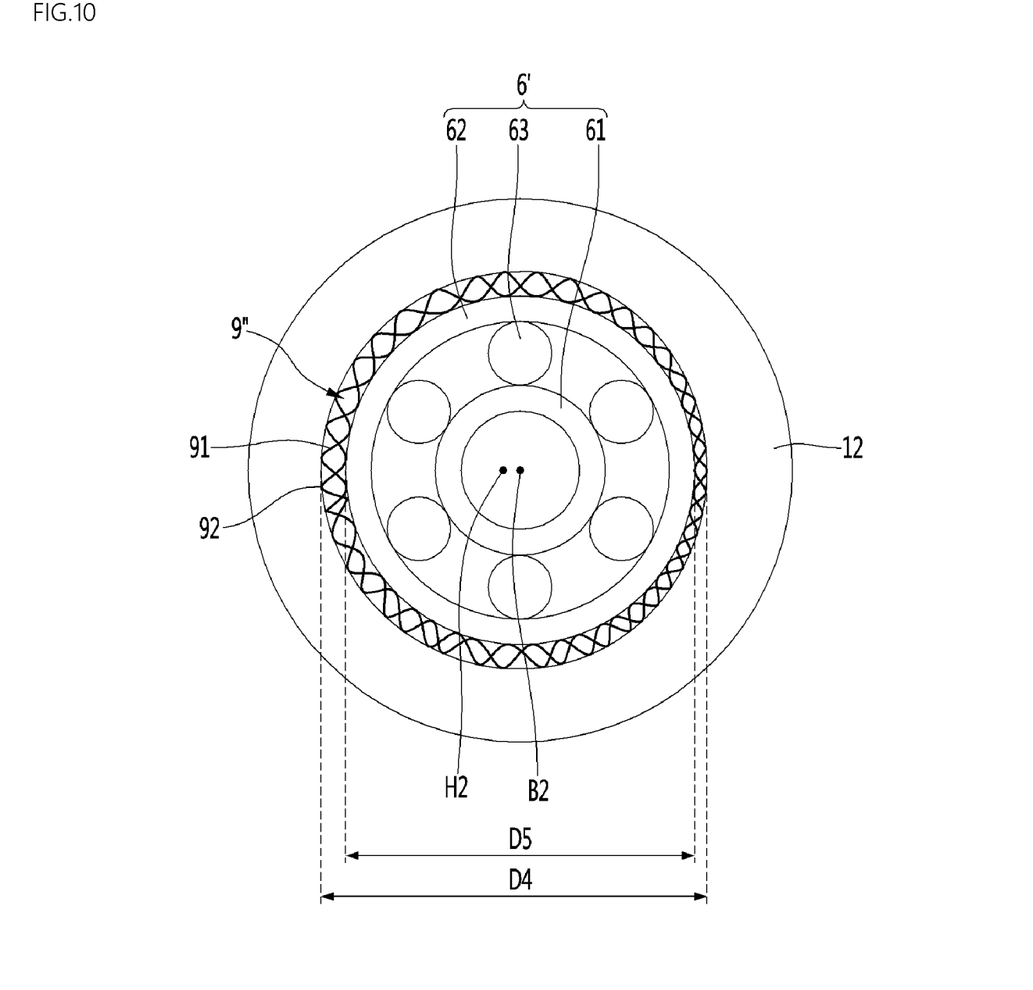
FIG. 10 is a cross-sectional view showing an example second elastic mesh elastically deformed by an example second bearing.

FIG. 8 is a sectional view showing another example motor. FIG. 9 is an enlarged sectional view of portion B of FIG. 8. FIG. 10 is a cross-sectional view when an example second elastic mesh is elastically deformed by an example second bearing.

In some implementations, the motor M may include a second bearing 6' of which external diameter D5 is smaller than the internal diameter D4 of a hollow part 12. The second bearing 6' may be mounted to a rotating shaft 3. The motor M may further include a second elastic mesh 9" that has a plurality of pores and that is disposed between the inner surface of the hollow part 12 and the outer surface of the second bearing 6'.

In this implementation, the other components except the second bearing 6' and the second elastic mesh 9" and their operations are identical or similar to those of the aforementioned implementation. Therefore, the components identical or similar to those of the aforementioned implementation are designated by like reference numerals, and their detailed descriptions will be omitted.

Only the installation position of the second elastic mesh 9" is different from that of the elastic mesh 9 of the aforementioned implementation, and its detailed structure and function may be identical to those of the elastic mesh 9 of the aforementioned implementation.

In some implementations, the motor M may include both of the elastic mesh 9 and the second elastic mesh 9", and the elastic mesh 9 and the second elastic mesh 9" may align the positions of a bearing 5 and the second bearing 6' to positions different from each other. The alignment of the position of the bearing 5 by the elastic mesh 9 is identical to that of the aforementioned implementation, and therefore, its detailed description will be omitted.

The second elastic mesh 9" may be press-fitted between an outer rim 62 of the second bearing 6' and the hollow part 12, and may be fixed to at least one of the outer rim 62 of the second bearing 6' and the hollow part 12 by the thermal conductive adhesive 96 as shown in FIG. 6. In some implementations, it will be apparent that the second elastic mesh 9" may have a shape in which a mesh part having a plurality of pores formed therein is curled at least twice as shown in FIG. 6.

The detailed structure of the second elastic mesh 9" is identical or similar to that of the elastic mesh 9 of the aforementioned implementation, and therefore, its detailed description will be omitted.

In some implementations, a second O-ring 64 of this implementation may include an inner ring 65 mounted to the rotating shaft 3 and an outer ring 66 spaced apart from the outer rim 62 of the second bearing 6'. In some implementations, the second O-ring 64 may be mounted to the rotating shaft 3 to be located inside the second elastic mesh 9".

A gap G2 may be formed between the outer circumference of the second O-ring 64 and the second elastic mesh 9".

In some implementations, the second O-ring 64 may not come in contact with the inner circumferential surface of the second elastic mesh 9", and thus the abrasion of the second elastic mesh 9" and the second O-ring 64 can be minimized. In some implementations, the gap G2 can assist air flowed by a diffuser 74 to be introduced into the plurality of pores of the second elastic mesh 9".

The second bearing 6', as shown in FIG. 10, may pressurize a portion of the second elastic mesh 9" in a state in which the center axis B2 does not correspond to the center axis H2 of the hollow part 12. In this case, the second elastic mesh 9" may support the second bearing 6' in the state in which the portion pressurized by the second bearing 6' is compressed.

For example, the center axis H2 of the hollow part 12 shown in FIG. 10 may not correspond to the center axis H1 of the elastic mesh housing part 18 shown in FIG. 4 due to an assembly tolerance of a motor housing 1 and a bracket 8. In this case, the position of the second bearing 6' may be aligned with the position of the rotating shaft 3 in the state in which the second bearing 6' is supported by the second elastic mesh 9", and the concentricities of the bearing 5 and the second bearing 6' may correspond to each other.

In this implementation, at least one of the elastic mesh 9 and the second elastic mesh 9" may be elastically deformed such that the concentricities of the bearing 5 and the second bearing 6' correspond to each other.

In some implementations, the concentricities of the bearing 5 and the second bearing 6' may correspond to each other as each of the elastic mesh 9 and the second elastic mesh 9" is elastically deformed according to the assembly tolerance of the motor housing 1 and the bracket 8.

For example, the position of the bearing 5 may be aligned by the elastic mesh 9, and the position of the second bearing 6' may be aligned by the second elastic mesh 9". In this case, the concentricities of the bearing 5 and the second bearing 6' can smoothly correspond to each other, as compared with the case of the aforementioned implementation.

In some implementations, a through-hole 13 facing at least a portion of the second elastic mesh 9" may be formed in the motor housing 1. A portion of the air flowed by the diffuser 74 may pass through the plurality of pores of the second elastic mesh 9", and the air passing through the plurality of pores of the second elastic mesh 9" may be smoothly discharged to the outside of the motor housing 1 through the through-hole 13.

In some implementations, a flow path through which air passes may be formed between the hollow part 12 and the second bearing 6' by the through-hole 13 formed in the motor housing 1. The second elastic mesh 9" is disposed in the flow path formed between the hollow part 12 and the second bearing 6', to efficiently dissipate heat transferred from the second bearing 6'.

Although some implementations of the present disclosure are described for illustrative purposes, it will be apparent to those skilled in the art that various modifications and changes can be made thereto within the scope of the disclosure without departing from the essential features of the disclosure.

Accordingly, the aforementioned implementations should be construed not to limit the technical spirit of the present disclosure but to be provided for illustrative purposes so that those skilled in the art can fully understand the spirit of the present disclosure.

The scope of the present disclosure should not be limited to the aforementioned implementations but defined by appended claims. The technical spirit within the scope substantially identical with the scope of the present disclosure will be considered to fall in the scope of the present disclosure defined by the appended claims.

What is claimed is:

1. A motor comprising:
   a motor housing;
   a rotating shaft assembly including a rotating shaft, a rotor, and a bearing, wherein the rotor and the bearing are mounted to the rotating shaft;
   a stator installed in the motor housing, the stator surrounding the rotor;
   a bracket mounted to the motor housing; and
   an elastic mesh that defines a plurality of pores, that is disposed between the bracket and the bearing, and that contacts the bracket and the bearing,
   wherein the elastic mesh has a hollow cylindrical shape and comprises a metal wire mesh comprising at least one metal wire,
   wherein the at least one metal wire has one or more curved portions, is irregularly tangled, and contacts both the bracket and the bearing,
   wherein the bearing comprises:
      an inner rim fixed to the rotating shaft,
      an outer rim spaced apart from the inner rim, and
      a rolling member disposed between the inner rim and the outer rim,
   wherein an internal diameter of the elastic mesh is less than or equal to an external diameter of the outer rim of the bearing, and
   wherein an inner circumference of the elastic mesh is in contact with an outer circumference of the outer rim of the bearing.

2. The motor according to claim 1,
   wherein the plurality of pores are open toward a radial direction of the elastic mesh and an axial direction of the elastic mesh.

3. The motor according to claim 1, wherein a height of the elastic mesh is greater than a height of the bearing.

4. The motor according to claim 1, wherein the elastic mesh includes a mesh part that has a shape that is curled at least twice, and
   wherein the mesh part includes:
      an inner mesh part located at an innermost side in a radial direction, the inner mesh part contacting an outer circumferential surface of the bearing, and
      an outer mesh part located at an outermost side in the radial direction, the outer mesh part contacting the bracket.

5. The motor according to claim 1, further comprising a thermal conductive adhesive that fixes the elastic mesh to at least one of an outer circumferential surface of the bearing or the bracket.

6. The motor according to claim 1, further comprising an O-ring that is fixed to the rotating shaft and located between the elastic mesh and the rotating shaft, the O-ring supporting the bearing,
wherein the O-ring has an external diameter less than the internal diameter of the elastic mesh.

7. The motor according to claim 6, wherein the O-ring and the elastic mesh define a gap between an outer circumference of the O-ring and the elastic mesh.

8. The motor according to claim 1,
wherein the bracket includes an elastic mesh housing part that has an internal diameter greater than the external diameter of the outer rim, and
wherein the elastic mesh is disposed between the outer rim and the elastic mesh housing part.

9. The motor according to claim 8, further comprising an O-ring that is mounted to the rotating shaft and that contacts the inner rim, the O-ring being spaced apart from the elastic mesh.

10. The motor according to claim 9, wherein the O-ring comprises:
an inner ring contacting the inner rim; and
an outer ring spaced apart from the outer rim, and
wherein the outer ring has an external diameter less than the internal diameter of the elastic mesh.

11. The motor according to claim 9, wherein the bracket further includes a cover part that covers a portion of the bearing between the inner rim and the outer rim, and
wherein the elastic mesh has a first end that contacts the cover part.

12. The motor according to claim 11, wherein the elastic mesh has a second end that is spaced apart from the rotor, the second end facing toward the rotor.

13. The motor according to claim 1, further comprising a second bearing mounted to the rotating shaft,
wherein the motor housing includes a hollow part having an internal diameter greater than a diameter of the rotating shaft, and
wherein the hollow part contacts the second bearing to thereby support the second bearing.

14. The motor according to claim 1, further comprising:
a second bearing mounted to the rotating shaft; and
a second elastic mesh defining a plurality of pores,
wherein the motor housing includes a hollow part that has an internal diameter greater than a diameter of the rotating shaft, and
wherein the second elastic mesh is disposed between an inner surface of the hollow part and an outer surface of the second bearing.

15. A motor comprising:
a motor housing;
a rotating shaft assembly including a rotating shaft, a rotor, and a bearing, wherein the rotor and the bearing are mounted to a rotating shaft;
a stator installed in the motor housing, the stator surrounding the rotor;
an impeller connected to the rotating shaft;
an impeller cover that surrounds an outer circumference of the impeller, the impeller cover defining an air inlet between the impeller and the impeller cover;
a bracket mounted to at least one of the motor housing or the impeller cover;
an elastic mesh that defines a plurality of pores, that is disposed between the bracket and the bearing, and that contacts the bracket and the bearing; and
a diffuser mounted to at least one of the impeller cover or the bracket, the diffuser including a guide vane configured to guide air toward a space between the elastic mesh and the rotor,
wherein the elastic mesh has a hollow cylindrical shape and comprises a metal wire mesh comprising at least one metal wire,
wherein the at least one metal wire has one or more curved portions, is irregularly tangled, and contacts both the bracket and the bearing,
wherein the bearing comprises:
an inner rim fixed to the rotating shaft,
an outer rim spaced apart from the inner rim, and
a rolling member disposed between the inner rim and the outer rim,
wherein an internal diameter of the elastic mesh is less than or equal to an external diameter of the outer rim of the bearing, and
wherein an inner circumference of the elastic mesh is in contact with an outer circumference of the outer rim of the bearing.

16. The motor according to claim 15,
wherein the bracket includes an elastic mesh housing part that has an internal diameter greater than the external diameter of the outer rim, and
wherein the elastic mesh is disposed between the outer rim and the elastic mesh housing part.

17. The motor according to claim 16, wherein the bracket comprises a cover part that covers a portion of the bearing between the inner rim and the outer rim, and
wherein the elastic mesh has a first end that contacts the cover part.

18. The motor according to claim 17, wherein the elastic mesh has a second end that is spaced apart from the rotor, the second end facing toward the rotor.

19. The motor according to claim 15, further comprising:
a second bearing mounted to the rotating shaft; and
a second elastic mesh defining a plurality of pores,
wherein the motor housing includes a hollow part that has an internal diameter greater than a diameter of the rotating shaft,
wherein the second bearing has an external diameter less than the internal diameter of the hollow part, and
wherein the second elastic mesh is disposed between an inner surface of the hollow part and an outer surface of the second bearing.

* * * * *